(No Model.) 3 Sheets—Sheet 1.
P. RODES.
STILL AND PROCESS.
No. 476,073. Patented May 31, 1892.

(No Model.)

P. RODES.
STILL AND PROCESS.

No. 476,073.

3 Sheets—Sheet 2.

Patented May 31, 1892.

WITNESSES
Geo. E. Frech.
Rol. A. Fitzgerald

INVENTOR
Philip Rodes
By
Lehmann Pattison & Kesht
attys.

(No Model.) 3 Sheets—Sheet 3.
P. RODES.
STILL AND PROCESS.
No. 476,073. Patented May 31, 1892.

Witnesses—
Geo. E. Frech.
Rob. A. Fitzgerald.

Inventor—
Philip Rodes
By
Lehmann Pattison Kisk
attys

UNITED STATES PATENT OFFICE.

PHILIP RODES, OF GREENFIELD, VIRGINIA.

STILL AND PROCESS.

SPECIFICATION forming part of Letters Patent No. 476,073, dated May 31, 1892.

Application filed February 18, 1892. Serial No. 422,014. (No model.)

*To all whom it may concern:*

Be it known that I, PHILIP RODES, of Greenfield, in the county of Nelson and State of Virginia, have invented certain new and useful Improvements in Stills and Processes; and I do hereby declare the following to be a full, clear, and exact description of the invention, such as will enable others skilled in the art to which it pertains to make and use it, reference being had to the accompanying drawings, which form part of this specification.

My invention relates to an improvement in stills and processes; and it consists in certain novel features of construction and the combination and arrangement of parts, which will be fully described hereinafter, and more particularly referred to in the claims.

The object of my invention is to construct an improved still for the production of alcoholic beverages in which an improved process of distillation is employed, whereby the alcoholic manner in the liquid to be distilled is most effectually and thoroughly separated from the foreign matter.

Figure 1:
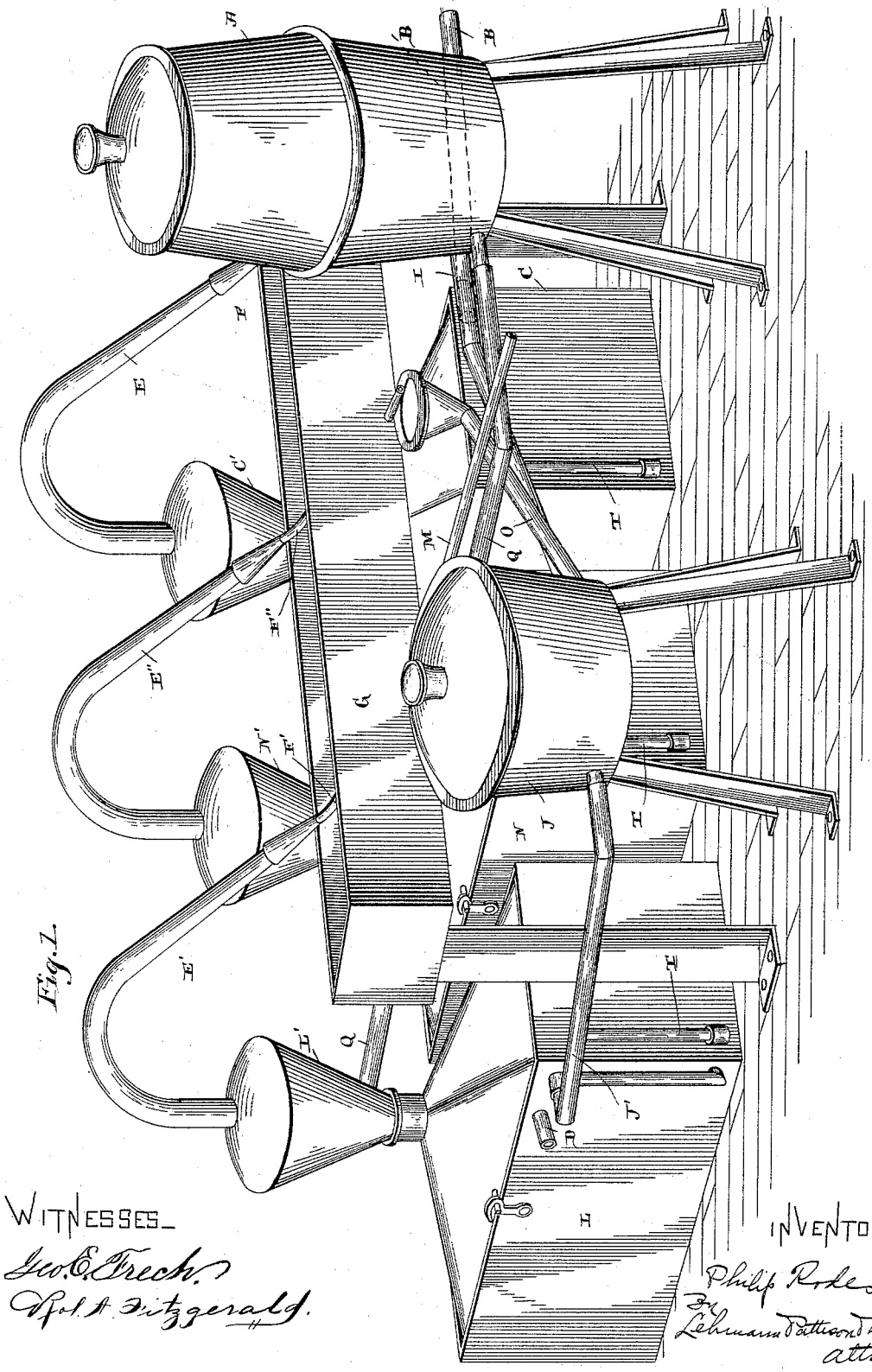
Figure 2:
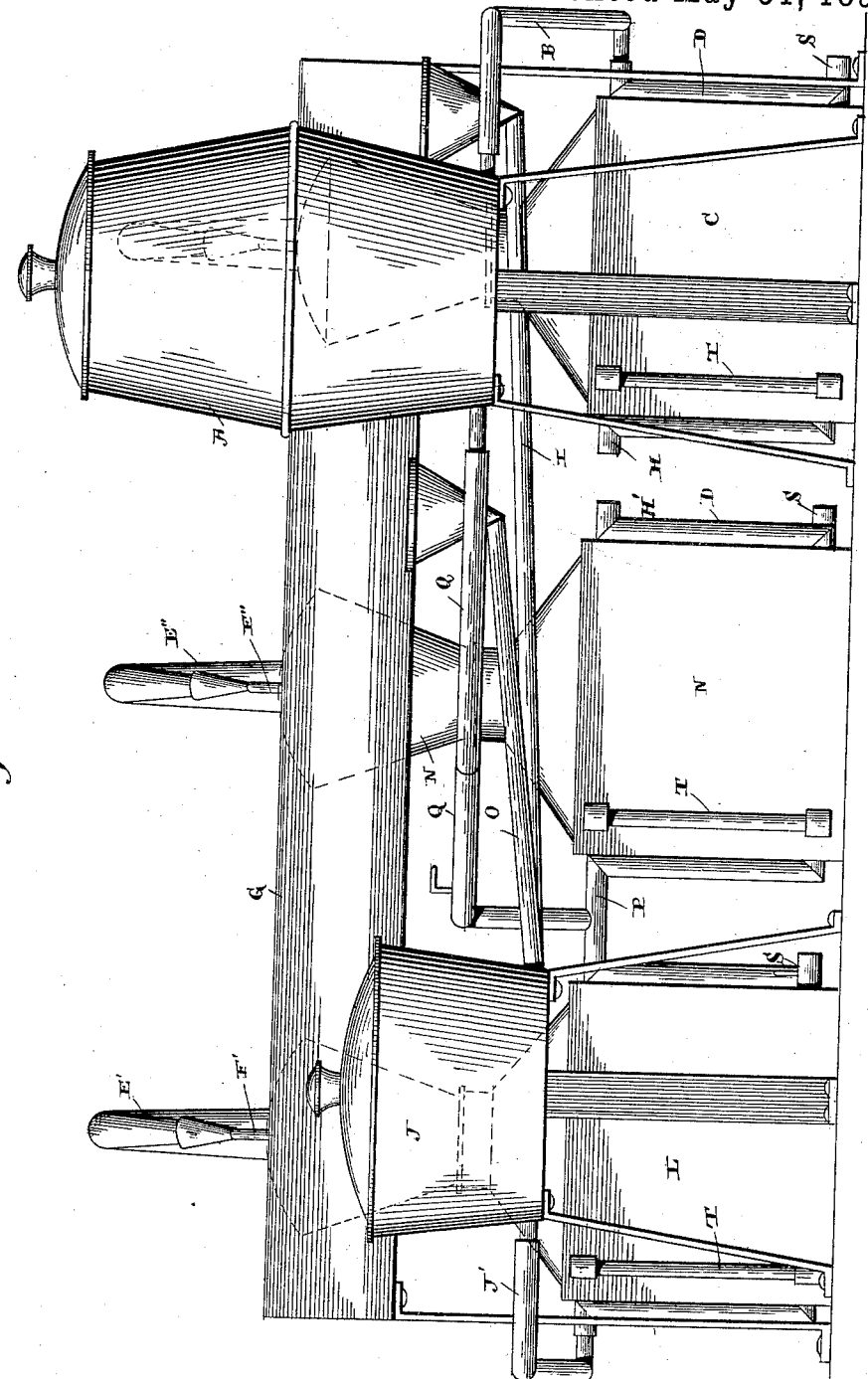
Figure 3:
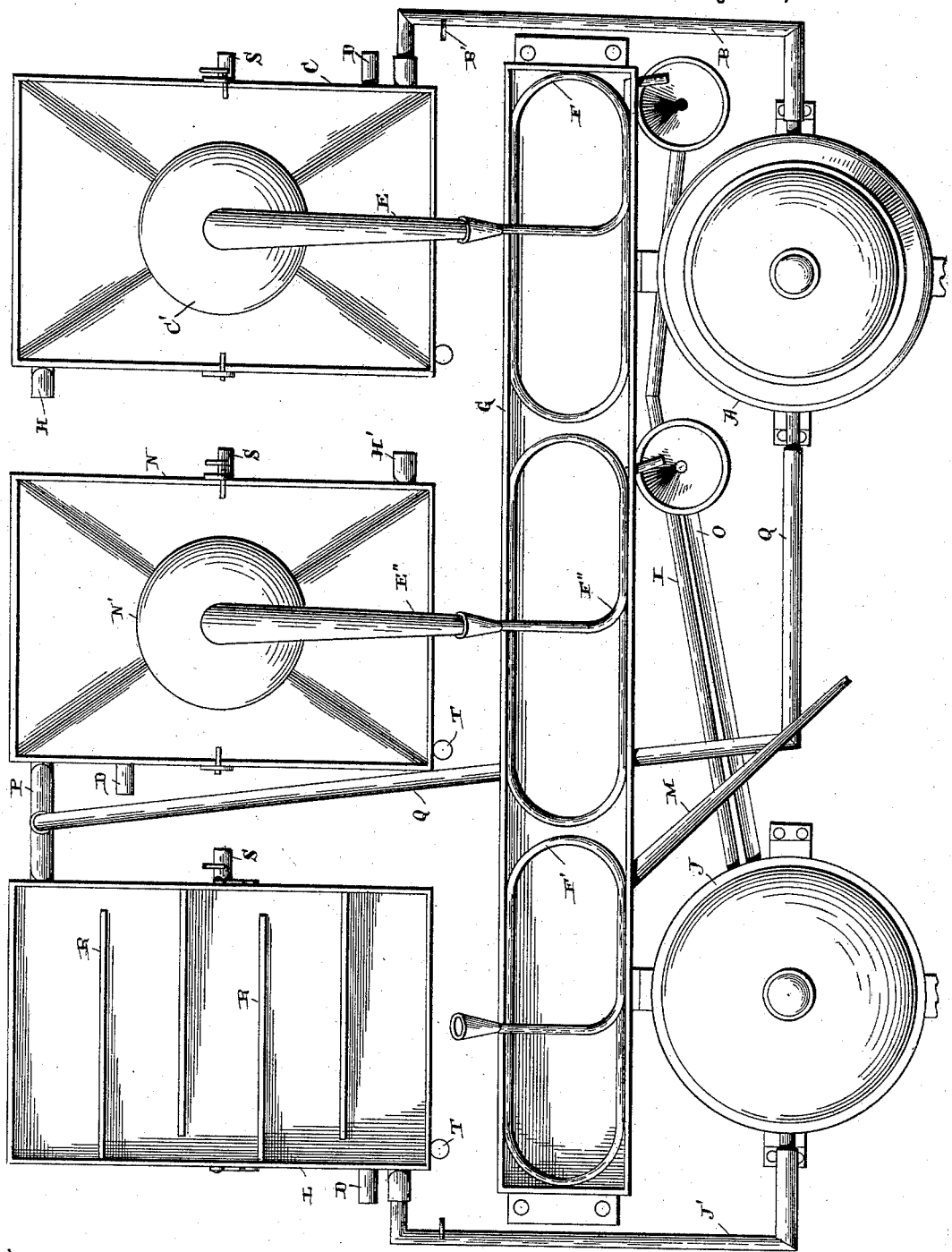

Referring to the accompanying drawings, Figure 1 is a perspective view of my improved apparatus. Fig. 2 is a side elevation of the same. Fig. 3 is a longitudinal sectional view of the still-vats.

As my improved still is designed more especially for the production of brandy, its operation in that connection will be herein described, though it is adapted for the manufacture of whisky and other liquors with equal efficiency.

A represents the tank or other vessel in which the cider is placed, and B a pipe which conducts the cider therefrom to the first still or vat C, the supply being regulated by the cock B'. Live steam is also admitted into the said vat through the pipe D, and it is also introduced into the other two vats, as will be seen. The cider in the still C is heated by the steam, and its alcoholic properties, being very volatile, evaporate quickly, and the vapor thus produced rises into the drum C', from which it is conveyed by the curved pipe E to the condenser F, which consists of a coil of pipe which is kept cold by flowing water in the pan G. The residue of the stock in the still C which has not vaporized is discharged through the pipe H at the opposite end of the still from where it has been introduced. The product which is formed in the condenser F, and which is known as "singlings," is conducted by the funneled pipe I to the singling tank or chamber J. From this tank the product is conveyed through the pipe J' to the still L, where it is again subjected to the action of steam introduced through the pipe D. The vapor generated by the product thus heated is conveyed through the drum L' and pipe E' to the condenser F', from which it is conveyed by the pipe M to the vessel placed thereunder for its reception. The stock or backing which is left in the still L, however, contains considerable alcoholic matter which has not vaporized, and this residue liquid is conveyed from the said still by means of the pipe P into the still N, where it is again subjected to the action of live steam. The vapor thus produced rises through the drum N' to the pipe E'', which conveys it to the condenser F'', from which it is discharged a liquid into the singling-pan J through the pipe O, and again run into the still L for the purpose of repeating the distilling process. Thus it will be seen that the backings of the still L are subjected to a continuous evaporizing process until all the alcohol contained therein is extracted, the refuse or waste being discharged from the still N through the pipe H' at the opposite end of the still from where it has been introduced. The proportion of alcohol contained in the backings from the still L is comparatively small, and in order to render a quick and ready evaporation in the still N a small quantity of the untreated cider is mingled therewith, which is introduced into the pipe P by means of the valved pipe Q, extending thereto from the tank A. None of the alcohol in the cider thus introduced into the still N is allowed to escape, as it is subjected to a second distillation in passing around through the still L along with the vaporized and afterward condensed backings.

The singling-pan J is very material to the successful operation of the still in several connections. By means of the said pan the flow of singlings into the still L may be regulated by means of a cock on the pipe J'. When a very good quality of fruit is being operated upon, the singlings are quite strong, and hence it is necessary to run them into the still L much slower than though a poorer quality was being passed. The pan acts as a reservoir, and the flow from it may be regulated independently of the output of the stills C and N. Again, it will be understood that with the stills running to their full capacity the pan J will be kept well filled, and hence when the operation of all the stills is stopped at night a sufficient amount of singlings will be in waiting in the pan to set in motion the finishing-still next morning while the stills C and N are being started. Hence it will be seen that at all times the operation in the three stills may be made simultaneous, thus avoiding all delay. A uniform flow of liquid to the finishing-still is obtained, the quantity passed being governed by its strength.

As shown in Fig. 3, the stills are provided with vertical deflectors R, which reach nearly across the same and which extend inward alternately from opposite sides of the still walls or sides. By means of these deflectors the liquid is subjected to a thorough heating by the steam before reaching the discharge-pipes H H' at the opposite ends of the vats from which it enters. The said pipes are upturned at their outer ends, as shown, so that there will only be a discharge from the stills after the liquid has reached a certain height.

Outlets S are provided at the bottoms of the stills for the purpose of withdrawing the liquid when it is desired to discontinue the operation of distillation.

The tops of the stills are made removable, as shown, so that the same may be readily accessible for the purpose of cleaning or repairing.

Gages T are provided on the ends of the stills for the purpose of ascertaining at a glance the quantity of liquid contained therein.

By my improved process and apparatus both the cider and the backings are subjected to double distilling treatments before being finally disposed of, thus insuring a most effectual abstraction of the alcoholic properties.

Having thus described my invention, I claim—

1. An improved distilling process consisting in vaporizing and subsequently condensing the untreated liquor, then vaporizing the product of the said condensation and subsequently condensing the vapor thus produced, then vaporizing the backings from the second vaporization, together with some of the untreated liquor, and then condensing it, and finally introducing the product of the last-described step into the product of the first condensation, substantially as described.

2. In an apparatus of the character described, the combination, with a still, a condenser therefor, and a singling-pan in communication with said condenser, of a second still, a condenser therefor, and a connection between the said last-named still and the singling-pan, substantially as shown and described.

3. In an apparatus of the character described, the combination, with a still, a condenser therefor, a singling-pan communicating with said condenser, a second still communicating with said pan, and a condenser for said second still, of a third still communicating with said second still and a condenser for said third still, which discharges into said singling-pan, substantially as shown and described.

4. In an apparatus of the character described, the combination, with the stills C L N and condensers therefor, the condensers for the stills C and N being in communication with the still L, of a communication between the stills L and N and a connection between the still N and the source of supply of the untreated liquid, substantially as shown and described.

In testimony whereof I affix my signature in presence of two witnesses.

PHILIP RODES.

Witnesses:
W. H. GOODWIN,
J. E. REVERCOMB.